No. 811,530.
PATENTED JAN. 30, 1906.
B. C. BUTLER.
COTTON CHOPPER.
APPLICATION FILED SEPT. 21, 1905.
2 SHEETS—SHEET 1.
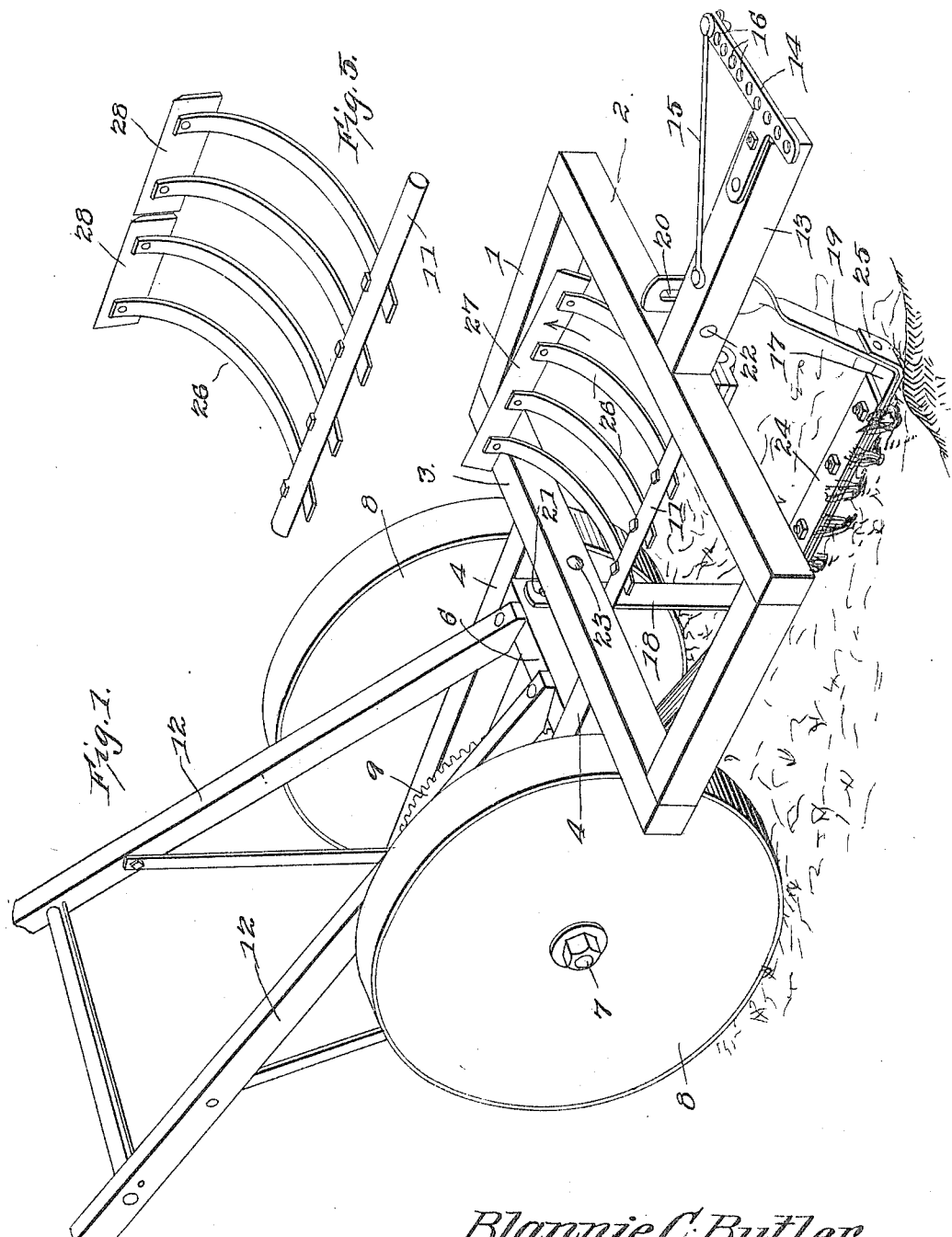
Witnesses
E. F. Stewart
Wm. Bagger
Blannie C. Butler,
Inventor.
by C. A. Snow & Co.
Attorneys

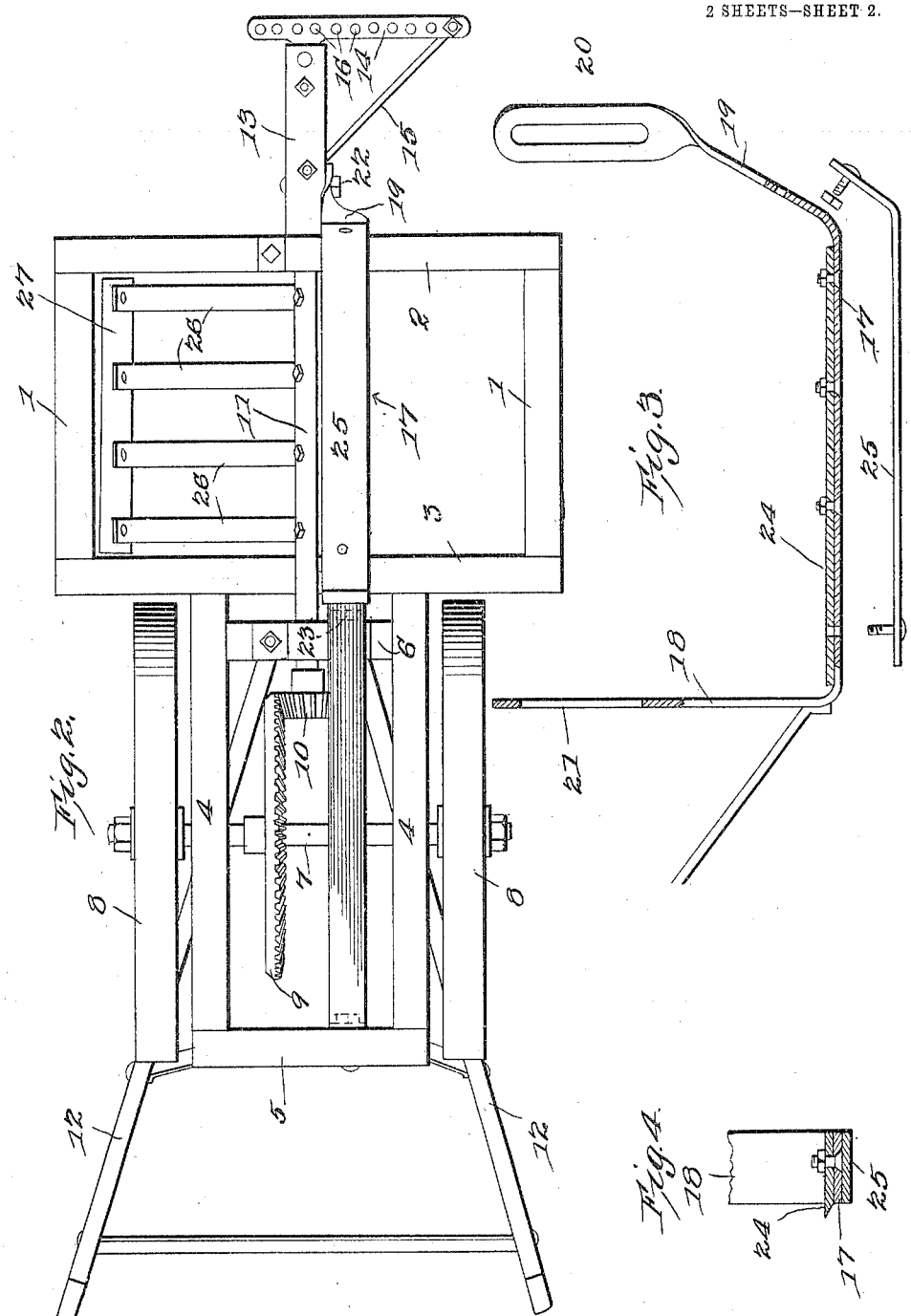

UNITED STATES PATENT OFFICE.

BLANNIE C. BUTLER, OF ASHEVILLE, NORTH CAROLINA.

COTTON-CHOPPER.

No. 811,530.      Specification of Letters Patent.      Patented Jan. 30, 1906.

Application filed September 21, 1905. Serial No. 279,510.

*To all whom it may concern:*

Be it known that I, BLANNIE C. BUTLER, a citizen of the United States, residing at Asheville, in the county of Buncombe and State of North Carolina, have invented a new and useful Cotton-Chopper, of which the following is a specification.

This invention relates to that class of devices which are generally known as "cotton-choppers" and which are utilized for the purpose of removing from the rows of young plants the superfluous ones, retaining only at suitable intervals such plants as are intended to form the "stands."

The objects of the invention are to promote the simplicity of construction, durability, efficiency of operation, and other desirable qualities of this class of devices; and with these and other ends in view, which will readily appear as the nature of the invention is better understood, the same consists in the improved construction and novel arrangement and combination of parts, which will be hereinafter fully described, and particularly pointed out in the claims.

In the accompanying drawings has been illustrated a simple and preferred form of the invention, it being, however, understood that no limitation is necessarily made to the precise structural details therein exhibited, but that changes, alterations, and modifications within the scope of the invention may be made when desired.

In the drawings, Figure 1 is a perspective view of a cotton-chopper constructed in accordance with the principles of the invention. Fig. 2 is a bottom plan view of the same. Fig. 3 is a side elevation, partly in section, showing the knife-supporting runner detached from the machine and the wear-shoe detached from said runner. Fig. 4 is a transverse sectional view of the knife-supporting runner with the wear-shoe attached thereto. Fig. 5 is a perspective view showing the rotary cutter and the shaft carrying the same detached from the machine, a slight modification being illustrated in this figure.

Corresponding parts in the several figures are indicated throughout by similar characters of reference.

The frame structure of this improved machine includes a rectangular front frame consisting of side pieces 1 1, connected by front and rear pieces 2 and 3, from which latter parallel side members 4 4 extend rearwardly, said side members being connected at their rear ends by a rear cross-piece 5 and a short distance in rear of the member 3 by a cross-piece 6. The side members 4 4 are provided with bearings for an axle 7, having carrying-wheels 8 8 and provided with a bevel-gear 9, meshing with a bevel-pinion 10 upon the rear end of a shaft 11, the bearings of which are connected with the front cross-beam 2 and with the cross-piece 6. Handles 12 for guiding the machine are suitably connected with the rear part of the frame structure. Extending forwardly from the front cross-piece 2 is a stub-tongue 13, to the front end of which is secured a laterally-extending draft-bar 14, reinforced by an obliquely-disposed brace 15 and having a plurality of apertures 16 for the attachment of the draft, as by means of a clevis, (not shown,) which may be laterally adjusted, as may be found desirable and necessary.

A runner member 17 is provided at its rear and front ends with upwardly-extending arms 18 and 19, the latter of which is forwardly inclined, so as to ride easily over the ground, while its upper end is quarter-twisted and provided with a slot 20. A similar slot 21 is formed near the upper end of the arm 18, the slots 20 and 21 being for the passage of bolts 22 and 23, whereby the runner member is connected adjustably with the stub-tongue 13 and with the frame member 3, respectively, said runner member being thus supported and slightly spaced from the central line of draft. This is important, for the reason that during the operation of the machine the runner member is to travel adjacent to the row of plants that are to be operated upon without contacting with said plants. Supported upon the runner member and suitably connected therewith is a knife or cutter 24, and the under side of the runner member is equipped with a shoe or wear-plate 25, which protects the runner member from wear and which may be readily renewed or replaced at a trifling expense.

The shaft 11, to which rotary motion is communicated from the axle of the machine, is provided with a plurality of curved resilient arms 26, supporting a cutter member 27, which as the shaft rotates coöperates with or engages the knife supported upon the runner in the shearing manner that the rotary knife of a lawn-mower engages a stationary blade to remove the plants intermediate the stands that are to be left. If it is desired to leave stands close together, the arms 26 may be made to support a plurality of cutter members, as 28, such construction being illustrated in Fig. 5 of the drawings.

When the improved machine is drawn over the field, the runner member constitutes a support for the front part of the frame, thus relieving the draft-animal of the weight of the frame. The runner is caused to travel adjacent to the row which is being straddled by the wheels of the machine, and the cutter or cutters connected with the rotary shaft 11 serve to remove the superfluous plants, as will be readily understood. The distance between the stands will be regulated by the length of the cutters 27 and 28, while the size of the stands will be gaged by the interspaces between said cutters. When a single cutter 27 is used, as shown in Fig. 1, the speed of rotation of the shaft 11 will determine the distance between the successive cuts, or, in other words, the size of the stands.

This improved machine, as will be seen, is simple in construction and easily operated, and it has been found to be practically efficient for the purposes for which it is intended.

Having thus described the invention, what is claimed is—

1. A runner, a cutter supported thereon, a shaft supported for rotation, and a cutter connected with the shaft and engaging the runner-supported cutter.

2. In a machine for chopping out plants, a cutter supported stationary with relation to the frame, and a rotary cutter engaging therewith.

3. In a machine for chopping out plants, a cutter supported adjacent to the row of plants operated upon, and a movable cutter engaging therewith.

4. In a machine for chopping out plants, a cutter supported adjacent to the row of plants operated upon, and a movable cutter connected with and supported by a rotary shaft for engagement therewith.

5. In a machine for chopping out plants, a relatively stationary cutter, and means for supporting said cutter adjacent to a row of plants; in combination with a movable cutter adapted for engagement with a stationary cutter, a shaft supported for rotation, and supporting means connecting said shaft with the movable cutter.

6. In a machine for chopping out plants, a cutter supported adjacent to the row of plants, a shaft supported for rotation, and resilient carrying-arms connected with the shaft, and a cutter carried by said arms.

7. A frame, a runner connected adjustably therewith, a cutter supported upon the runner, a shaft supported for rotation, and a cutter connected with said shaft and engaging the cutter supported upon the runner.

8. A frame, a runner having arms connected adjustably with the frame, a cutter supported upon the runner, and a movable cutter engaging therewith.

9. A frame, carrying-wheels supporting the rear part of the frame, a runner supporting the front part of the frame, a cutter supported upon the runner, and a movable cutter engaging therewith.

10. A frame, carrying-wheels for the frame, a runner partly supporting the frame, a cutter supported upon the runner, and a movable cutter engaging therewith.

11. A frame, carrying-wheels connected therewith, a runner connected with the frame adjacent to and spaced from the line of draft, a cutter supported upon the runner, and a movable cutter engaging therewith.

12. In a machine for chopping out plants, a frame having rearward-extending side members, a wheel-carrying axle connected for rotation with said side members and having a bevel-gear, a longitudinal shaft supported for rotation and having a pinion meshing with the bevel-gear, carrying-arms extending from said shaft, a cutter carried by said arms, a runner having arms connected with the frame for vertical adjustment, and a cutter supported upon the runner.

13. A frame, carrying-wheels connected therewith, a runner connected with and partly supporting the frame said runner being disposed adjacent to the longitudinal center of the frame, a cutter supported upon the runner, a movable cutter engaging therewith, a stub-tongue connected with the frame, and a lateral draft-bar connected with the tongue.

In testimony that I claim the foregoing as my own I have hereto affixed my signature in the presence of two witnesses.

BLANNIE C. BUTLER

Witnesses:
I. A. MILLER,
H. W. OWNBEY.